US012280676B2

(12) United States Patent
Cho et al.

(10) Patent No.: US 12,280,676 B2
(45) Date of Patent: Apr. 22, 2025

(54) AUTOMATIC TRANSPORTATION SYSTEM

(71) Applicant: GREEN POWER CO., LTD., Hwaseong-si (KR)

(72) Inventors: Jung Goo Cho, Suwon-si (KR); Doo Ik Song, Yongin-si (KR)

(73) Assignee: GREEN POWER CO., LTD., Hwaseong-si (KR)

( * ) Notice: Subject to any disclaimer, the term of this patent is extended or adjusted under 35 U.S.C. 154(b) by 767 days.

(21) Appl. No.: 17/544,175

(22) Filed: Dec. 7, 2021

(65) Prior Publication Data
US 2022/0176824 A1 Jun. 9, 2022

(30) Foreign Application Priority Data

Dec. 8, 2020 (KR) .................. 10-2020-0170717
Feb. 8, 2021 (KR) .................. 10-2021-0017342

(51) Int. Cl.
| | |
|---|---|
| *B60L 5/00* | (2006.01) |
| *B60L 3/04* | (2006.01) |
| *H02H 5/04* | (2006.01) |
| *H02J 50/12* | (2016.01) |

(52) U.S. Cl.
CPC .............. *B60L 5/005* (2013.01); *B60L 3/04* (2013.01); *H02H 5/042* (2013.01); *H02J 50/12* (2016.02); *B60L 2200/26* (2013.01); *B60L 2250/16* (2013.01); *H02J 2310/40* (2020.01)

(58) Field of Classification Search
CPC ........ B60L 5/005; B60L 3/04; B60L 2200/26; B60L 2250/16; H02J 50/12; H02J 2310/40; H02H 5/042
See application file for complete search history.

(56) References Cited

U.S. PATENT DOCUMENTS

| | | | |
|---|---|---|---|
| 10,923,951 B2 * | 2/2021 | Na ............................ | H02J 9/00 |
| 11,936,195 B2 * | 3/2024 | Na ............................ | H02J 7/02 |
| 2018/0105045 A1 * | 4/2018 | Hosek ..................... | B60L 5/005 |
| 2022/0176824 A1 * | 6/2022 | Cho ........................ | B60L 53/122 |

FOREIGN PATENT DOCUMENTS

| | | | | |
|---|---|---|---|---|
| CN | 115622273 A | * | 1/2023 | |
| CN | 118449076 A | * | 8/2024 | |
| JP | S6292720 A | * | 4/1984 | |

(Continued)

OTHER PUBLICATIONS

An Office Action mailed by the Korean Intellectual Property Office on Mar. 16, 2021, which corresponds to Korean Patent Application No. 10-2021-0017342 and is related to U.S. Appl. No. 17/544,175.

(Continued)

*Primary Examiner* — Jason C Smith
(74) *Attorney, Agent, or Firm* — Studebaker Brackett PLLC

(57) ABSTRACT

The present disclosure relates to an automatic transportation system that moves along a rail and is powered by induction feeding, and more particularly, to a terminal block configured to facilitate installation and extension of a cable for a configuration of an induction power track and to prevent a fire accident due to overheating in advance by an overheat detection unit provided therein and an automatic transportation system using the same.

15 Claims, 13 Drawing Sheets

(56) References Cited

FOREIGN PATENT DOCUMENTS

| JP | 62075220 A | * | 4/1987 | | |
|---|---|---|---|---|---|
| JP | S62-092720 A | | 4/1987 | | |
| JP | H06225483 A | * | 8/1994 | | |
| JP | 10201006 A | * | 7/1998 | ............... | B60L 3/04 |
| JP | H10-201006 A | | 7/1998 | | |
| JP | 2010177185 A | * | 8/2010 | | |
| JP | 5358208 B2 | * | 12/2013 | | |
| KR | 10-2008-0034783 A | | 4/2008 | | |
| KR | 20080034783 A | * | 4/2008 | | |
| KR | 20080040271 A | * | 5/2008 | | |
| KR | 20100130711 A | * | 12/2010 | | |
| KR | 102408046 B1 | * | 6/2022 | | |
| KR | 102550549 B1 | * | 7/2023 | | |
| KR | 102641715 B1 | * | 2/2024 | | |

OTHER PUBLICATIONS

An Office Action; "Notice of Reasons for Refusal," mailed by the Japanese Patent Office on Oct. 25, 2022, which corresponds to Japanese Patent Application No. 2021-198505 and is related to U.S. Appl. No. 17/544,175.

* cited by examiner

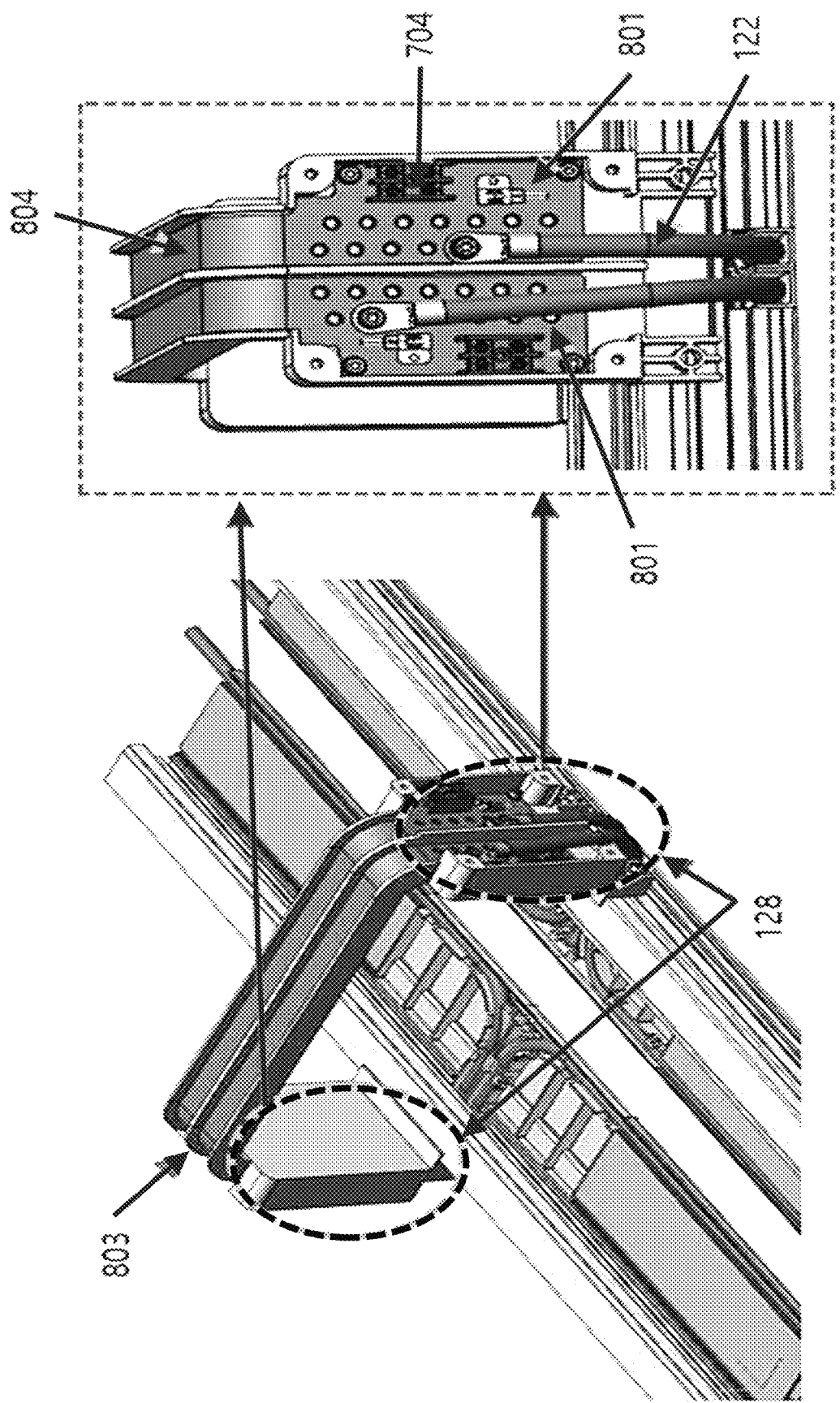

AUTOMATIC TRANSPORTATION SYSTEM

CROSS-REFERENCE TO RELATED APPLICATION

This application claims benefit of priority to Korean Patent Application Nos. 10-2020-0170717, filed on Dec. 8, 2020 and 10-2021-0017342 filed on Feb. 8, 2021 in the Korean Intellectual Property Office, the disclosure of which is incorporated herein by reference in its entirety.

TECHNICAL FIELD

The present disclosure relates to an automatic transportation system that moves along a rail and is powered by induction feeding, and more particularly, to a terminal block configured to facilitate installation and extension of a cable for a configuration of an induction power track and to prevent a fire accident due to overheating in advance by an overheat detection unit provided therein and an automatic transportation system using the same.

BACKGROUND ART

The content described below merely provides background information related to the present embodiment and does not constitute a related art.

In general, automatic transportation systems are configured such that a transfer vehicle transports, stores, and warehouses or releases materials or parts, while moving along traveling rails installed in production lines of factories.

For example, the automatic transportation system is installed in large hospitals, semiconductor and flat panel display production factories, logistics warehouses, etc. with many small transport objects to be transported, and the transfer vehicle runs along a rail installed on a floor or a rail installed on a ceiling.

In the automatic transportation system, an induction power cable is installed along a traveling rail, an induction power track is formed as a closed loop, and an inverter is connected to the induction power track. In this state, when current is applied to the induction power cable, the transfer vehicle is driven by power received in a non-contact manner based on magnetic induction to transport an object.

In general, in the automatic transportation system, the induction power cable comes out of an output terminal of an inverter, is installed along one side of the traveling rail, is returned from an end of the induction power track, is installed along the other side of the traveling rail, and is connected to the other output terminal of the inverter, so as to be installed.

If a length of the induction power cable is long, an installation work is very difficult and dangerous because the induction power cable, which is heavy, should be installed, while being carried, and takes a lot of time. In particular, the problem is more serious when the traveling rail is configured to be complicated. In addition, in the case of extending the traveling rail, the induction power cable needs to be installed again.

When the induction power cable is divided into several strands so as to be installed and the strands of the induction power cable are connected through a terminal block, the installation work is easy, and in the case of extending the rail, only an extension portion may be connected through the terminal block, without having to install the induction power cable again, which is very convenient. However, when the induction power cable is connected through the terminal block and a high-frequency current flows therethrough, overheating may occur due to poor connection of the terminal block, and in severe cases, overheating may lead to a fire, and thus, the terminal block is rarely used in the induction power cable.

DISCLOSURE

Technical Problem

An aspect of the present disclosure provides an automatic transportation system in which, in configuring an induction power track, a cable installation structure utilizing a terminal block connecting one or more induction power cables to each other or connecting an induction power cable and a lead-in cable is provided, thereby efficiently installing and extending a cable for configuring the induction power track.

In addition, the terminal block used for the configuration of the induction power track may cause overheating due to poor fastening of bolts or the like due to high-frequency current, and in a worst case scenario, overheating may lead to a fire, which is quite dangerous.

Another aspect of the present disclosure provides an automatic transportation system in which an overheat detection unit is provided on a terminal block so that overheating occurring in the terminal block may be recognized and blocked by an inverter, thereby preventing a fire accident due to overheating in advance.

When a safe terminal block is introduced, an induction power cable to be connected between terminal blocks may be cut out in advance, lug-treated, and then installed in a rail, so as to be simply assembled, significantly reducing an installation time. However, a normal terminal block has only one hole for fixing a cable lug, and thus, when a pre-cut and lug-treated cable is installed along the rail, a slight cable length error occurs depending on a cable installation method, and in this case, the cable may be insufficient or in surplus so it may be difficult to connect the cable to the terminal block. Another aspect of the present disclosure provides a method for easily connecting a pre-cut and lug-treated induction power cable to a terminal block even if there is a length error less than a certain length.

Technical Solution

According to an aspect of the present disclosure, an automatic transportation system moving along a rail and receiving electric power by inductive feeding, includes an induction power cable installed along the rail; an induction power track configured as a closed loop by connecting one or more induction power cables to each other; an inverter configured to apply an alternating current (AC) to the induction power track; a lead-in cable configured to connect an output from the inverter to the induction power track; a heat sensing wire installed inside or outside the induction power cable or the lead-in cable and configured to detect heating of the cable; a detection device installed inside the inverter and configured to detect an open/short of the heat sensing wire; and a terminal block configured to connect one or more induction power cables to each other or connect the induction power cable to the lead-in cable, wherein the terminal block includes a terminal for electrically connecting two cables; and an overheating detecting unit configured to detect overheating of the terminal, wherein the inverter recognizes an overheated state of the terminal block by shorting the heat sensing wire using an output from the overheat detection unit.

The terminal block is configured as a busbar having a plurality of fixing holes so as to be easily connected even if an induction power cable, which is previously cut and end (lug)-treated, has a partial length error.

Advantageous Effects

In the automatic transportation system according to the present disclosure, a safe terminal block that may detect and block overheating is provided, and a cable for configuring an induction power track may be more efficiently installed and extended by connecting induction power cables to each other or connecting the induction power cable and a lead-in cable to each other using the terminal block. In addition, when the induction power cable is installed in a rail, the induction power cable may be previously cut and lug-treated so as to be directly installed and assembled on the spot, thereby significantly reducing a working time.

DESCRIPTION OF DRAWINGS

FIG. 13 is a view illustrating a structure of a busbar yoke terminal block having a plurality of fixing holes and connected to both sides of a yoke.

BEST MODES

Figure 1:
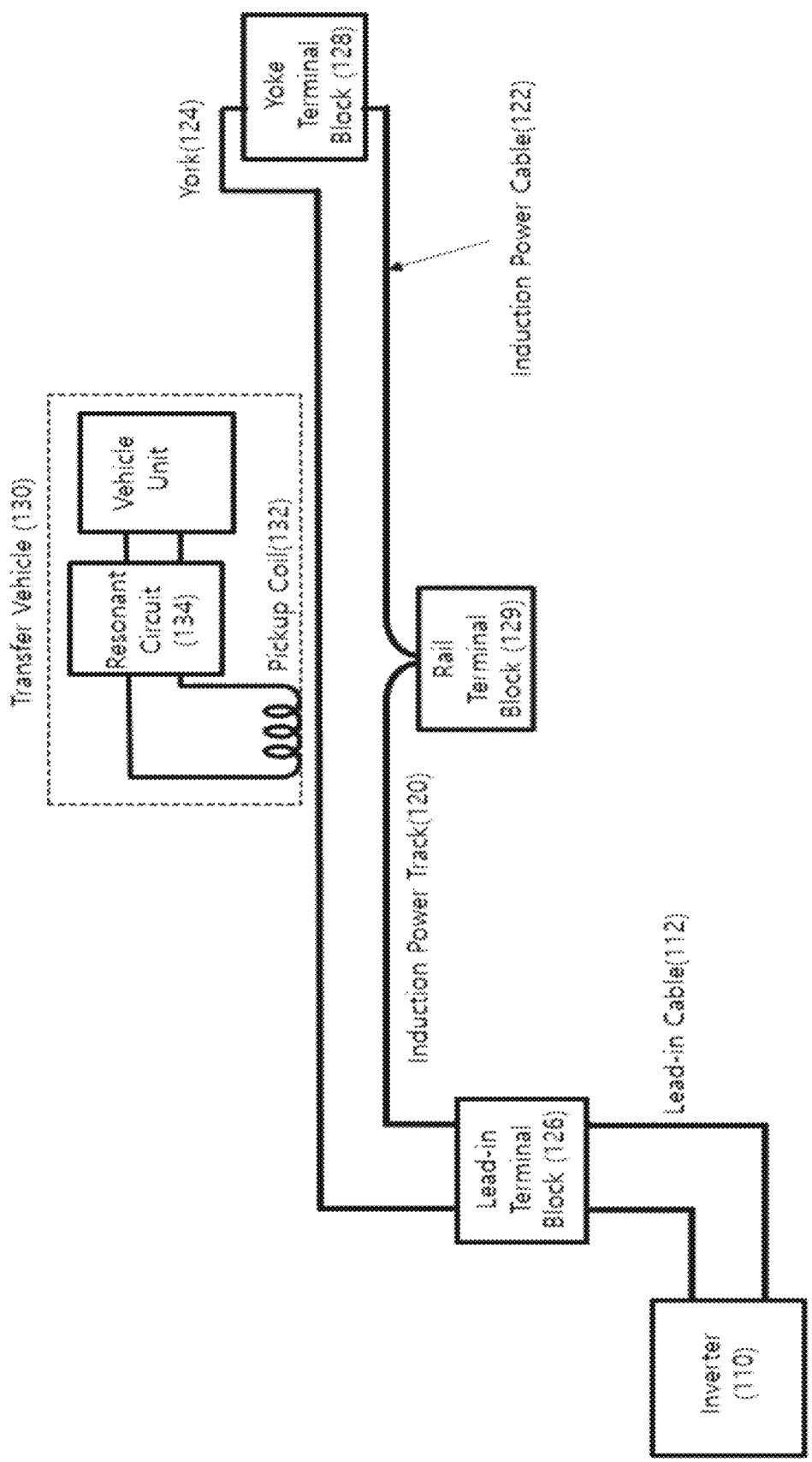
FIG. 1 is a configuration diagram illustrating a structure of an automatic transportation system according to the present embodiment.

Hereinafter, embodiments of the present disclosure are described so that those of ordinary skill in the art may easily implement the embodiments. It should be noted that reference numerals indicated for components or actions in the accompanying drawings use the same reference numerals as much as possible to indicate the same components or actions in other drawings. Also, in describing the present disclosure, if it is determined that a detailed description of a related known function or a known configuration may unnecessarily obscure the gist of the present disclosure, the detailed description is omitted.

FIG. 1 is a configuration diagram illustrating a configuration of an automatic transportation system according to the present embodiment.

Referring to FIG. 1, an automatic transportation system according to the present embodiment includes an inverter 110, a lead-in cable 112, an induction power cable 122, an induction power track 120 including the induction power cable, a cable yoke 124, a lead-in terminal block 126, a yoke terminal block 128, a rail terminal block 129, and a transfer vehicle 130, and the transfer vehicle 130 includes a pickup coil 132 and a resonant circuit 134.

The inverter 110 performs a function of converting DC power supplied from a power source into AC power and supplying the AC power to the induction power cable 122.

The inverter 110 may include a resonant circuit for matching a resonant frequency of the induction power track 120 of a closed loop including the induction power cable 122.

In the present embodiment, the inverter 110 may include a detection device (not shown) installed inside or outside the induction power cable 122 or the lead-in cable 112 and detecting open/short of a heat sensing wire for sensing heating of a cable.

Such a detection device continuously or periodically detects an open/short state of the heat sensing wire and notifies the inverter 110 of a detected state of the heat sensing wire. Meanwhile, in the present embodiment, the short state of the heat sensing wire is used as an agreed signal indicating that the terminal block is in an overheated state. Accordingly, when the inverter 110 detects the short of the heat sensing wire through the detection device, the inverter 110 may recognize that a current state of the terminal block is overheated.

When overheating occurs in the terminal block and the heat sensing wire is shorted, the inverter 110 may detect a corresponding situation and block an inverter output to block the AC power supply to the induction power cable 122.

Meanwhile, when a plurality of terminal blocks are provided in the automatic transportation system, the inverter 110 may recognize a position of a terminal block in an overheated state, and output a recognition result to a user through a display or notify a higher controller of the recognition result. For example, the inverter 110 may recognize the position of the terminal block in an overheated state by measuring resistance of the closed loop of the heat sensing wire formed when the heat sensing wire is shorted. To this end, the inverter 110 may collect and store information such as identification information and installation location information for each terminal block installed in the automatic transportation system in advance.

The lead-in cable 112 performs a function of connecting an output of the inverter 110 to the induction power track.

Figure 2A:
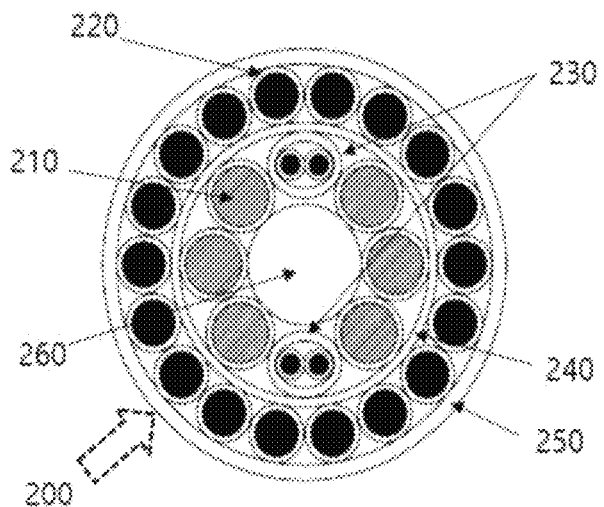
FIGS. 2A-2C are views illustrating structures of a lead-in cable and an induction power cable according to the present embodiment.

The lead-in cable 112 is also configured by overlapping two strands of the induction power cables, and when the induction power track is disposed far away from the inverter 110, a co-axial cable as shown in FIG. 2A may be used to solve a problem that inductance of the lead-in cable increases to reduce power transmission efficiency or to generate unnecessary magnetic flux to heat a magnetic material around the lead-in cable. The lead-in cable 112 having a coaxial cable structure includes an inner core wire 210, an outer core wire 220, and a heat sensing wire 230 as indicated by 200 in FIG. 2A.

A strong high-frequency current applied from the inverter 110 flows through the inner core wire 210, and this current flows from the inverter 110 toward the induction power track 120 or from the induction power track 120 toward the inverter 110.

The outer core wire 220 is disposed to surround a circumference of the inner core wire 210 so that a high-frequency current applied from the inverter 110 flows in a direction opposite to that of the inner core wire 210.

The lead-in cable 112 is configured such that the inner core wire 210 is inserted in the middle of the outer core wire 220, so that magnetic fluxes generated by the inner core wire 210 and the outer core wire 220 may be canceled out so that inductances from the outer core wire 220 and the inner core wire 210 are zero.

The heat sensing wire 230 is installed inside the lead-in cable 112 and performs a function of detecting heat of the cable. In another embodiment, the heat sensing wire 230 may be installed outside the lead-in cable 112.

In the case of the lead-in cable 112, the heat sensing wire 230 is installed symmetrically inside the cable along a length direction of the cable. Through this, heat of the lead-in cable 112 may be accurately and reliably detected.

The heat sensing wire 230 is formed by twisting two elastic conductors covered with a coating that melts at a predetermined temperature. When a surrounding temperature rises to the certain temperature or higher, the coating of the heat sensing conductor melts and the two conductors are attached by elasticity to become a short circuit. A heating state of the cable may be known by detecting the short circuit of the heat sensing conductor.

In the present embodiment, in addition to detection of overheating of the cable, the heat sensing wire 230 is shorted using an output of an overheat detection unit in the terminal block when the terminal block is overheated, and through this, the heat sensing wire 230 operates to allow the inverter to recognize an overheated state of the terminal block.

The induction power track 120 may be configured by installing the induction power cable 122 on a traveling rail installed along a predetermined path so that the transfer vehicle 130 may travel.

In the present embodiment, the induction power track 120 may be configured as a closed loop in which one or more induction power cables 122 are connected to each other.

The induction power cable 122 is installed along the traveling rail and supplies power to the transfer vehicle 130 by a magnetic induction method.

Hereinafter, a structure of the induction power cable 122 according to the present embodiment is described with reference to FIGS. 2B and 2C together. Meanwhile, FIG. 2B illustrates a heat sensing wire-integrated induction power cable 300, and FIG. 2C illustrates a heat sensing wire-separated induction power cable 400.

Figure 2B:
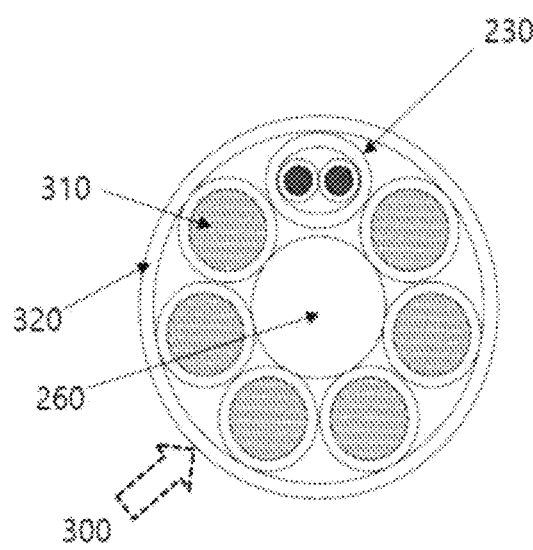

First, as shown in FIG. 2B, the induction power cable 122 according to the present embodiment includes a plurality of core wires 310 and the heat sensing wire 230. The plurality of core wires 310 and the heat sensing wire 230 are continuously twisted in a length direction of the cable, and the heat sensing wire 230 may detect both internal heat and external heat of the induction power cable.

Figure 2C:
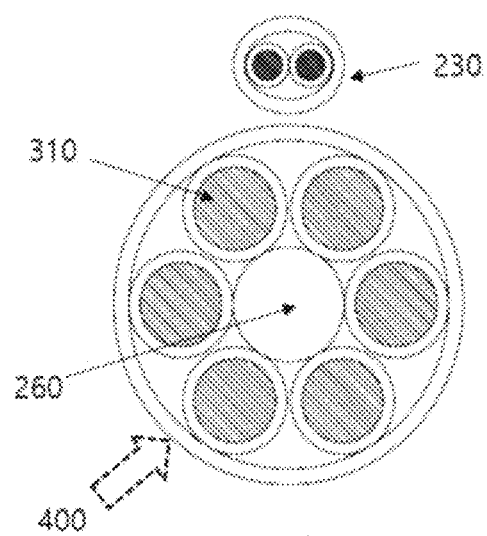

In another embodiment, the heat sensing wire 230 of the induction power cable 122 may be installed outside the cable as shown in FIG. 2C.

Meanwhile, at least one cable yoke 124 may be provided on the path of the induction power track 120. Such a cable yoke 124 returns the induction power cable 122 installed along one side of the induction power track 120 to the other side of the induction power track 120 or serves as a connection route for guiding the induction power cable 122 to another induction power track 120.

For example, referring to FIG. 1, it can be seen that the induction power cable installed on one side of the induction power track 120 is returned through the return cable yoke 124 at the end of the loop and connected to the other end of the induction power track 120.

The terminal block serves to connect one or more induction power cables 122 or connect the induction power cables 122 and the lead-in cable 112 to each other.

In the present embodiment, the terminal block may include a lead-in terminal block 126, a yoke terminal block 128, and a rail terminal block 129.

The lead-in terminal block 126 performs a function of interconnecting the induction power cable 122 and the lead-in cable 112.

Figure 3:
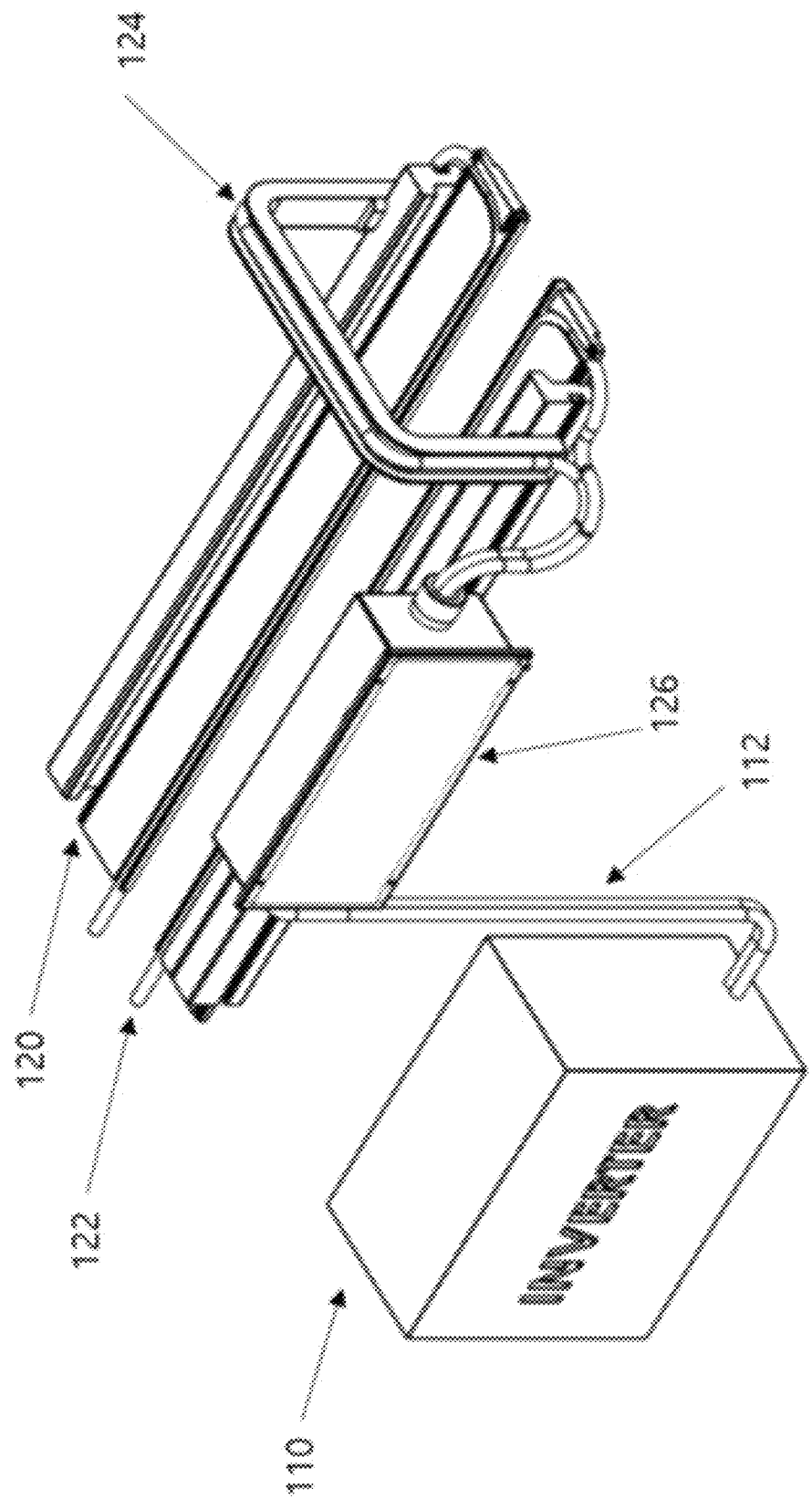
FIG. 3 is a view illustrating a lead-in terminal block for connecting an induction power cable and a lead-in cable according to the present embodiment.

For example, referring to FIG. 3, it can be seen that the induction power cable 122 and the lead-in cable 112 are connected to each other using the lead-in terminal block 126 in the automatic transportation system according to the present embodiment.

The lead-in terminal block 126 interconnects the lead-in cable 112 and the induction power cable 122 used as an extension line when a distance between the induction power track 120 and the inverter 110 for supplying a high-frequency current is long, thereby solving a problem of power loss that may occur due to an increase in the distance.

The yoke terminal block 128 is installed on a cable yoke formed of a plastic material to connect two induction power cables 122 to each other in configuring the induction power track.

Figure 4A:
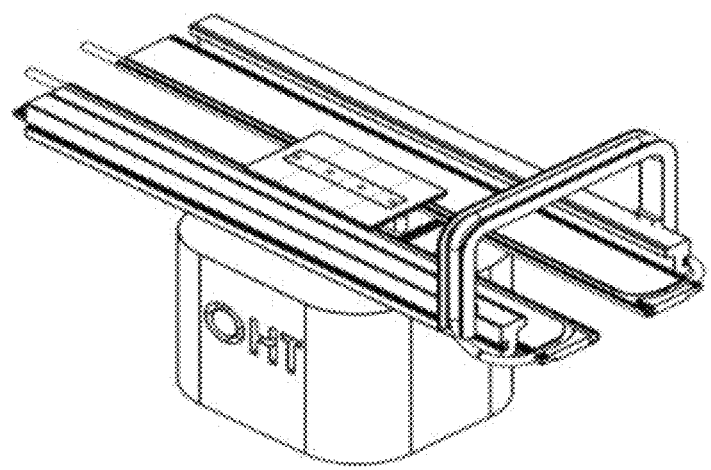
FIGS. 4A and 4B are views illustrating yoke terminal blocks for connecting one or more induction power cables to each other according to the present embodiment.
Figure 4B:
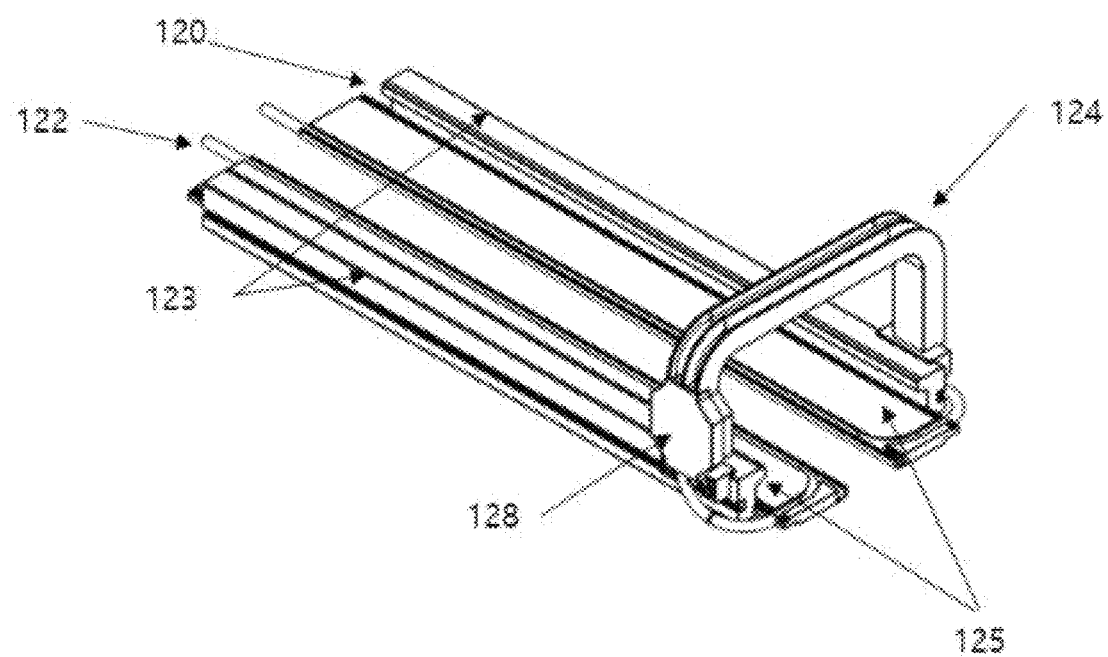

For example, referring to FIG. 4, it can be seen that the two induction power cables are connected to each other using the yoke terminal block 128 in the automatic transportation system according to the present embodiment. Meanwhile, FIG. 4A shows the automatic transportation system of a related art to which the yoke terminal block 128 is not applied, and FIG. 4B shows the automatic transportation system of the present embodiment to which the yoke terminal block 128 is applied.

The yoke terminal block 128 may be preferably provided on the return cable yoke provided at the end of an arrangement path of the induction power track 120 to facilitate installation and extension of the induction power track 120, and may be implemented as a yoke embedded terminal block.

In the case of the yoke terminal block 128 according to the present embodiment, two cables are interconnected through the yoke terminal block 128, unlike the induction power track 120 of the related art in which one cable is seamlessly connected. This may simplify a work for installing the cable compared to the related art, and has the effect of making it easier to perform the work for extending the cable.

Figure 10:
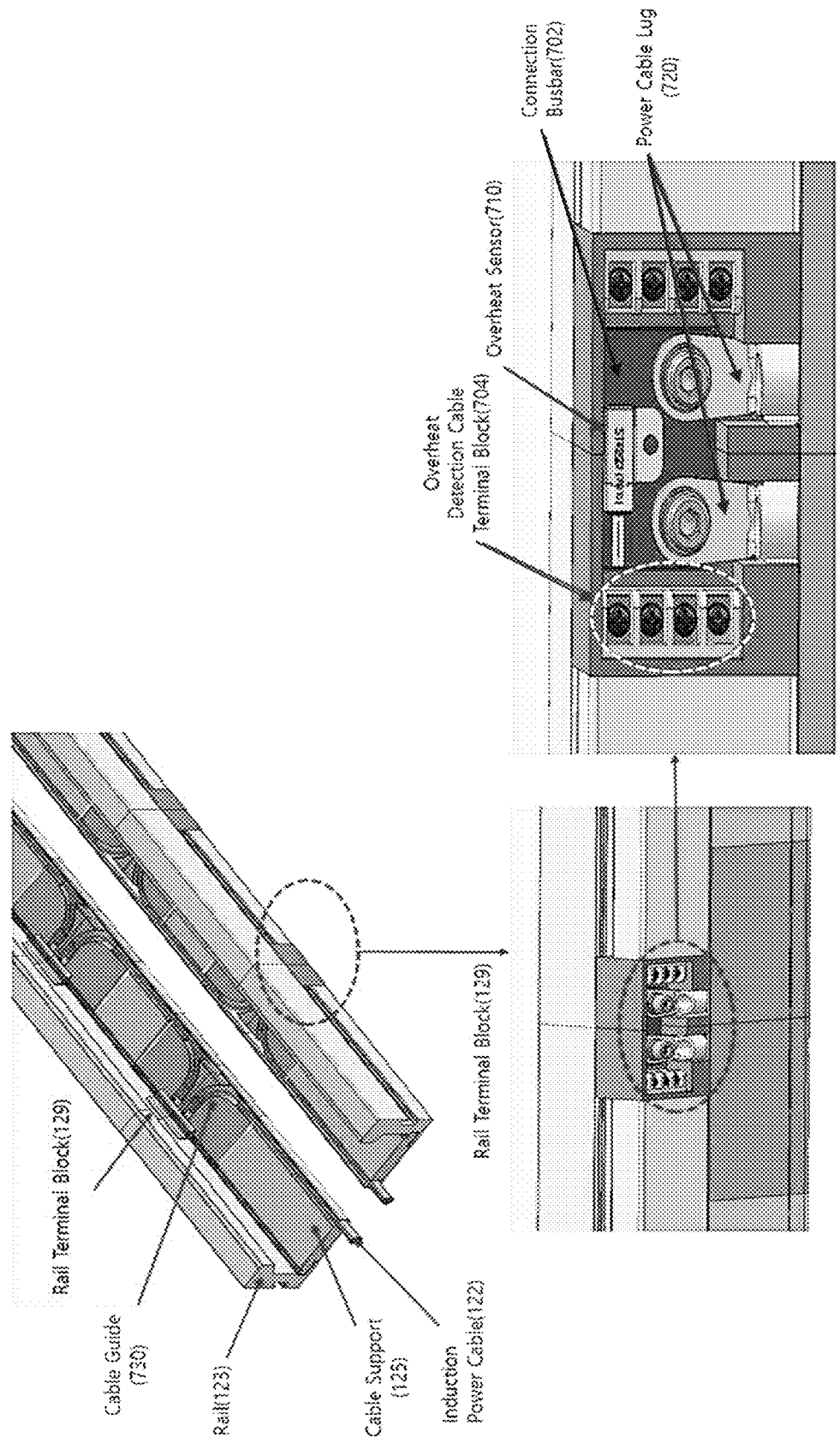
FIGS. 10 to 11 are views illustrating a structure of a rail terminal block installed below a rail connection portion according to the present embodiment.

As shown in FIG. 1, the rail terminal block 129 is a device installed in the middle of the rail to connect the induction power cable, and may divide the induction power cable more, thus facilitating installation of the induction power cable. As shown in FIG. 10, the rail terminal block has a space formed by cutting away a lower portion of the rail below a connection portion to which a unit rail is connected, and includes a terminal block housing formed of a plastic material, an induction power cable terminal (i.e., a connection busbar) 702, a heat sensing wire terminal (i.e., overheat detection cable terminal block) 704, an overheat detection unit (i.e., overheat sensor), etc. The induction power cable is installed in a groove of a cable support 125 installed along the rail 123, and a cable guide 730 for drawing out the induction power cable toward the rail is installed in order to connect the rail terminal block 129.

Meanwhile, the terminal block used for a configuration of the induction power track may be overheated due to poor fastening of bolts, etc. due to a high-frequency current, which may lead to a fire in extreme cases and thus is quite dangerous.

In order to solve this problem, in the present embodiment, the lead-in terminal block 126, the yoke terminal block 128 and the rail terminal block 129 include an overheat detection unit thereon and detect overheating thereof through the overheat detection unit. When overheating of the terminal block is detected, the heat sensing wire is shorted using an output from the overheat detection unit so that the inverter 110 recognizes the overheated state of the terminal block, and through this, an output from the inverter 110 may be blocked to prevent a fire accident due to the overheating in advance. This will be described in more detail in the process of describing the structure of the terminal block.

The transfer vehicle 130 performs an operation of transporting a predetermined transport material, while traveling on the induction power track 120. The transfer vehicle 130 may include a power receiving unit receiving electric power from the induction power cable 122 in a non-contact manner, a driving unit driving the transfer vehicle 130, and an energy storage device (not shown) storing power supplied from the power receiving unit, etc.

The power receiving unit may include a first pickup coil 132, a second resonant coil 134 connected to the first pickup coil 132, a rectifier rectifying an output voltage of the first pickup coil 132, and a regulator connected to the rectifier.

The power receiving unit may drive the transfer vehicle 130 by supplying electric power supplied from the induction power cable 122 to the driving unit.

Hereinafter, the structure of the terminal block according to the present embodiment is described with reference to FIGS. 5 to 8 together.

Figure 5:
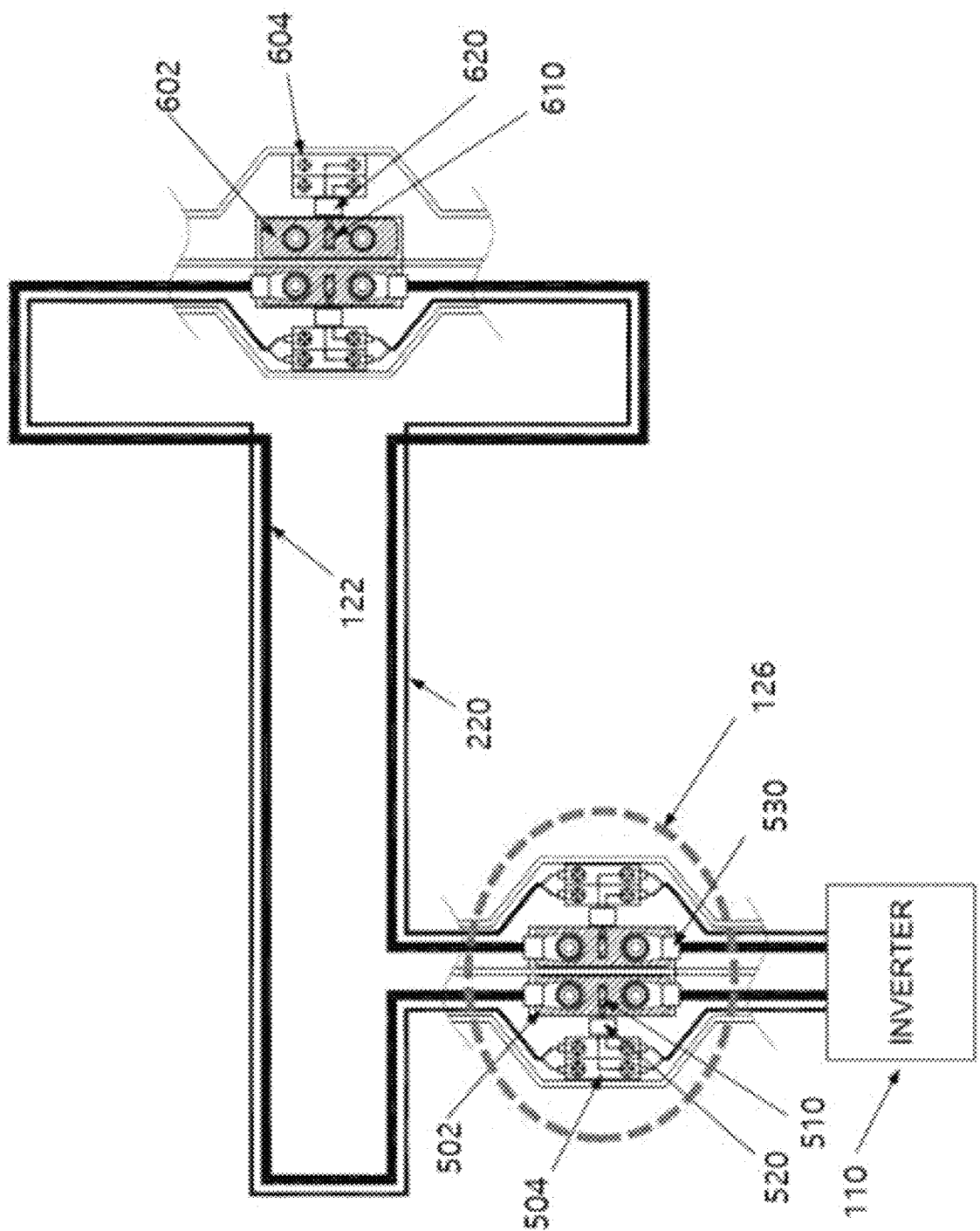
FIG. 5 is a view illustrating a structure of a lead-in terminal block and a yoke terminal block for configuring an induction power track according to the present embodiment.

FIG. 5 is a view illustrating a structure of the lead-in terminal block and the yoke terminal block for configuring the induction power track according to the present embodiment.

Referring to FIG. 5, the lead-in terminal block 126 and the yoke terminal block 128 according to the present embodiment may include induction power cable terminals 502 and 602, heat sensing wire terminals 504 and 604, and overheat detection units 510 and 610, respectively.

The terminal performs a function of electrically connecting two cables. For example, referring to FIG. 5, the lead-in terminal block 126 may include the lead-in cable terminal 502 and the heat sensing wire terminal 504 for electrically connecting the induction power cable and the lead-in cable.

The yoke terminal block 128 may include the induction power cable terminal 602 and the heat sensing wire terminal 604 for electrically connecting the induction power cable and the induction power cable.

The overheat detection units 510 and 610 perform a function of detecting overheating of the terminal.

In the present embodiment, the overheat detection units 510 and 610 may be implemented as temperature sensors or temperature contacts. The terminal block operates so that the inverter 110 recognizes an overheated state of the terminal block by shorting the heat sensing wire 230 using the output from the overheat detection units 510 and 610.

Hereinafter, a detailed operation of the terminal block using the output of the overheat detection units 510, 610, and 710 to short the heat sensing wire 230 is described.

First, when the overheat detection units 510, 610, or 710 of the terminal block is a temperature contact, the temperature contact has a characteristic of being short-circuited at a preset temperature or higher, and thus, the heat sensing wire may be simply shorted when the terminal block is overheated by directly connecting an output from the temperature contact to the heat sensing wire.

In another embodiment, when the overheat detection units 510, 610, or 710 of the terminal block is a temperature sensor, the temperature sensor may sense a temperature of the terminal block, and may short the heat sensing wire through a relay (not shown) in the case of overheating.

To this end, the terminal block may be implemented to include the controllers 520 and 620 generating contact signals for temperature sensing and relay driving. For example, the controllers 520 and 620 may divide the terminal block temperature measured through the temperature sensor into a warning level and a cut-off level, and provide a warning or cut-off signal to the inverter 110 by differentiating patterns for opening and shorting the heat sensing wire.

In addition, the terminal block may be implemented to additionally include a non-contact power supply unit based on magnetic induction to produce electric power upon receiving magnetic flux generated from the induction power cable 122 to drive the controller.

Figure 6:
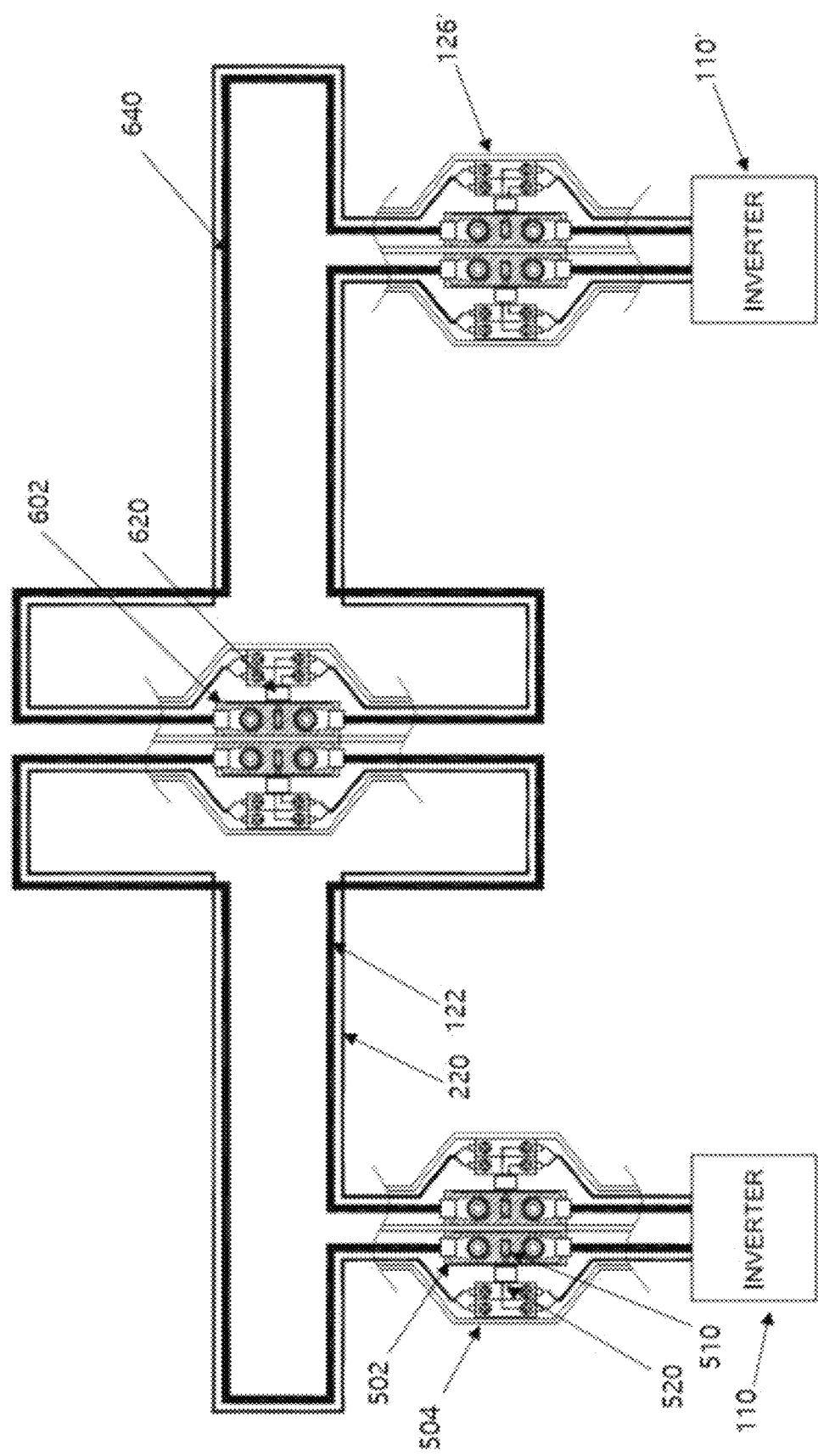
FIGS. 6 and 7 are views illustrating an extension structure of an induction power track utilizing a yoke terminal block according to the present embodiment.
Figure 7:
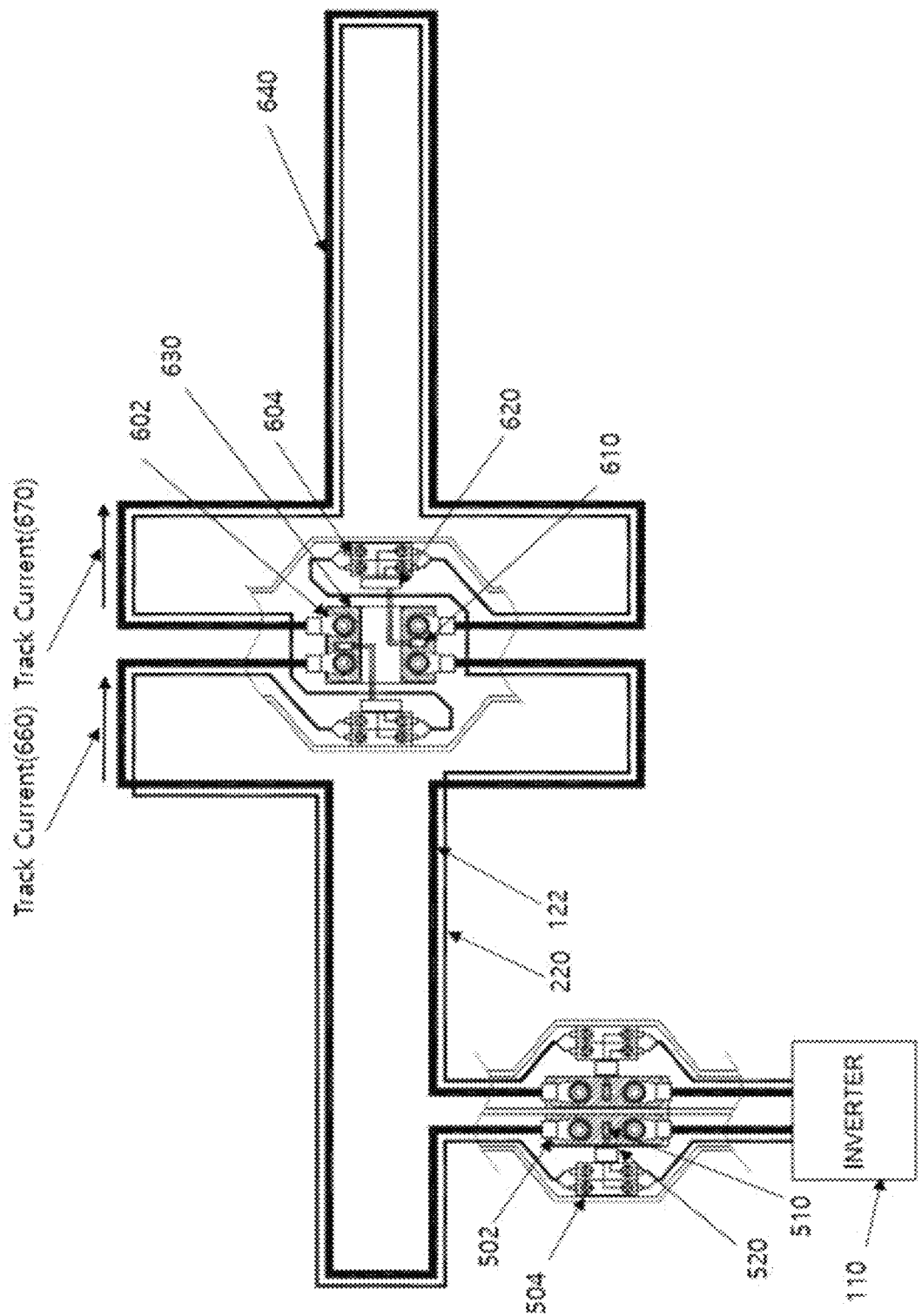

Meanwhile, in FIG. 5, a case in which only a terminal of one side connection busbar of the yoke terminal block 128 is used for the implementation of one induction power track configured as a closed loop is used is illustrated, but a terminal of the other side connection busbar 630 may be additionally used as shown in FIGS. 6 and 7 when the induction power track 640 (=second induction power track) is extended.

FIG. 6 is a view illustrating a case in which a separate induction power track 640 adjacent to one induction power track 120 is installed. Referring to FIG. 6, it can be seen that the induction power track 640 connected to a separate inverter is symmetrically additionally configured by utilizing the terminal of the other side connection busbar 630 of the yoke terminal block 128.

FIG. 7 is a view illustrating a case in which the existing induction power track 120 is extended and configured.

Referring to FIG. 7, the initially installed induction power track 120 configures a closed loop as the induction power cable 122 returns through the yoke terminal block 128, and when the rail and the induction power track need to be extended later, a direction of the connection busbar in the yoke terminal block 128 may be turned so that a direction 670 of a current flowing in the extended induction power track is the same as a current direction 660 of the existing induction power track as shown in FIG. 7.

In addition, the heat sensing wire terminal may also be connected such that that the heat sensing wire is crossed so as to be connected together in the same direction in which the induction power cable is connected.

Meanwhile, in the present embodiment, a shape of the connection busbar for configuring the extended induction power track and a connection form of the heat sensing wire is not limited to a specific shape and form.

Figure 8:
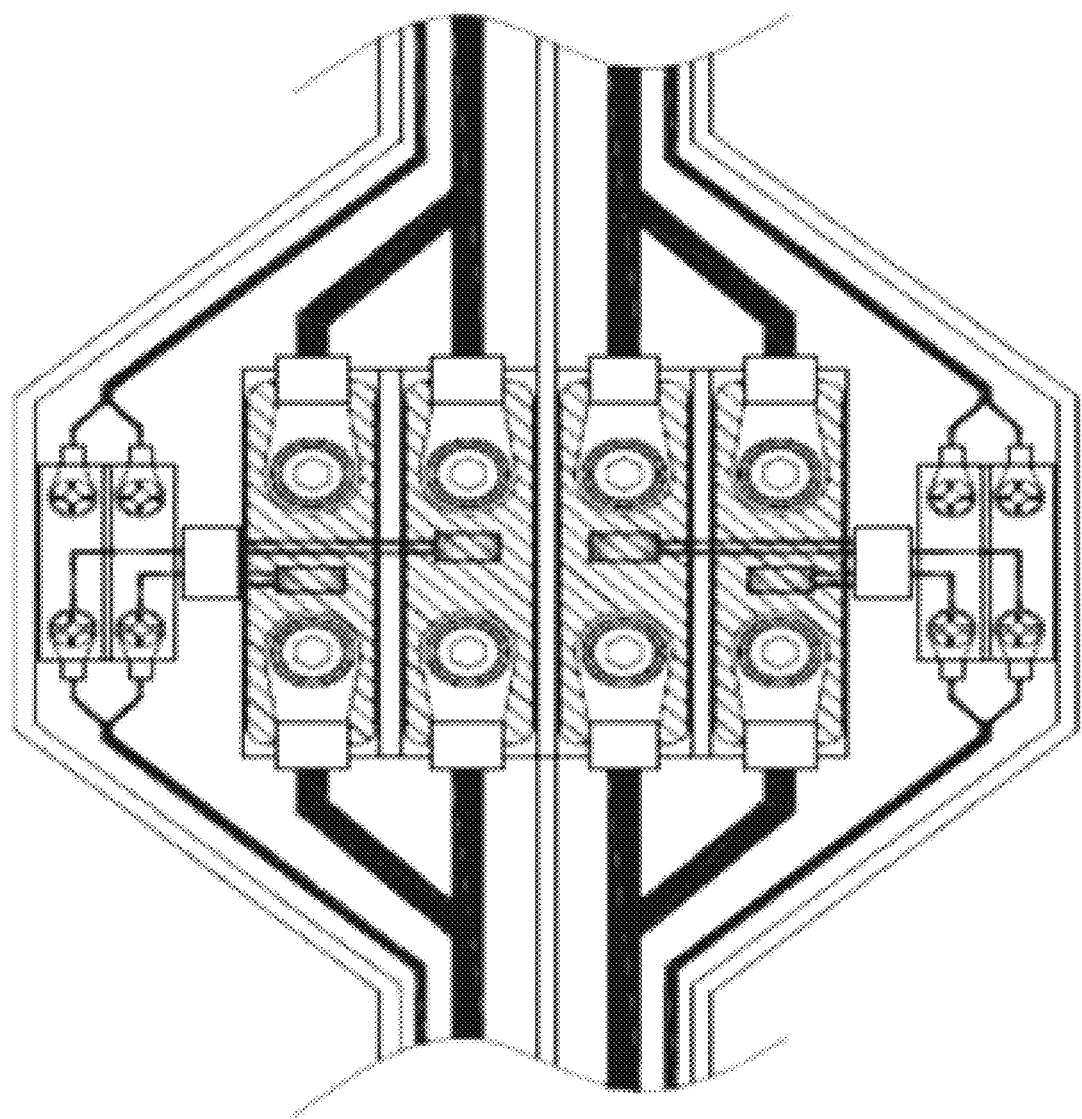
FIGS. 8 and 9 are views illustrating a structure of a second terminal block according to another embodiment.

FIG. 8 is a view illustrating a structure of a terminal block according to another embodiment.

In the present embodiment, connection of the cable on the terminal block may be configured such that one terminal or one cable may be divided into several terminals or cables and connected to several terminals. For example, referring to FIG. 8, it can be seen that the induction power cable is divided into several cables and connected to a plurality of terminals. In the present embodiment, a form in which the cables are divided and connected on the terminal block and the number of terminals provided corresponding thereto are not limited to a specific value.

Figure 9:
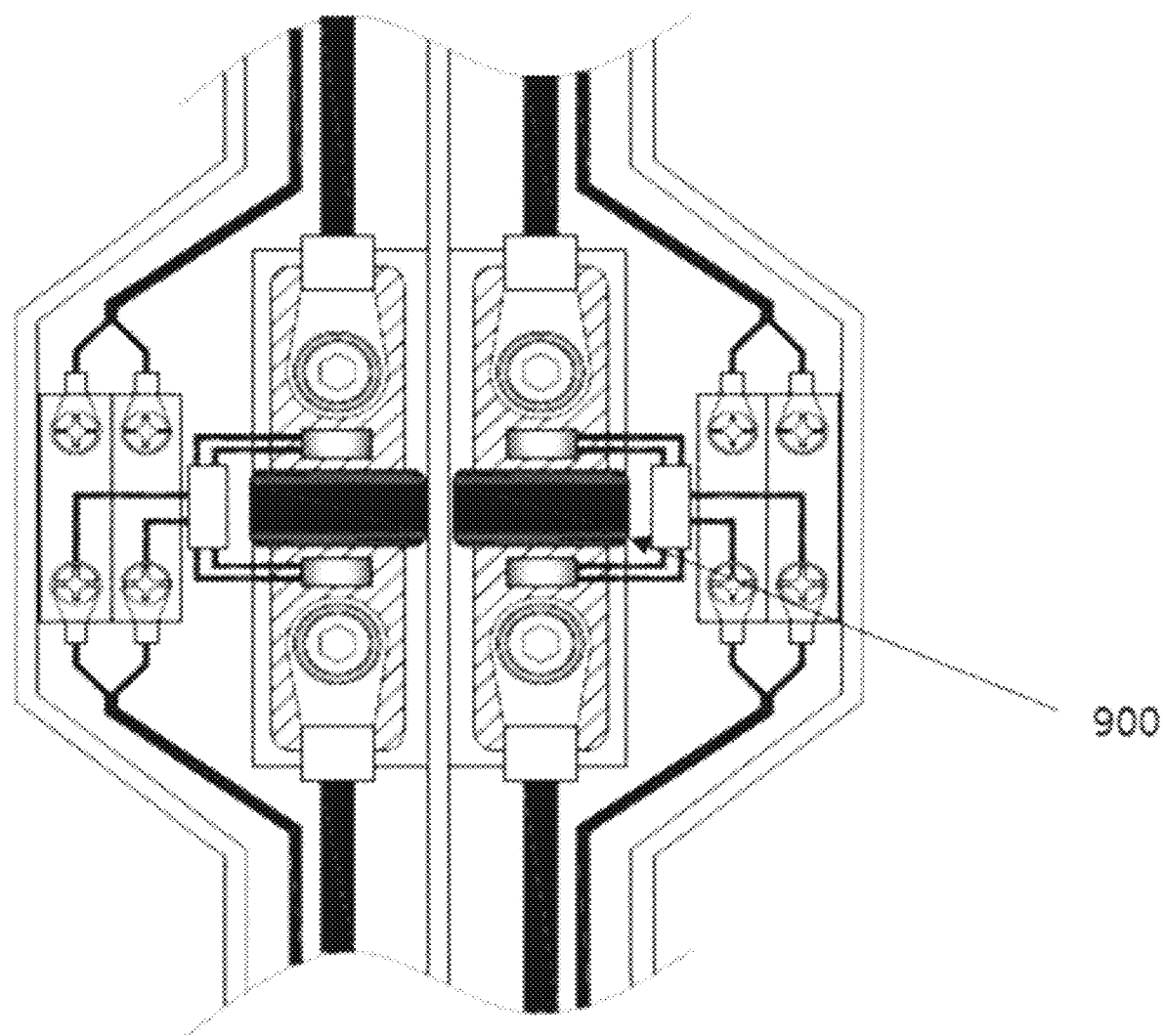

FIG. 9 is a view illustrating a structure of a terminal block according to another embodiment. Meanwhile, the structure of the terminal block according to another embodiment may be applied to the yoke terminal block 128 connecting two induction power cables to each other, but is not necessarily limited thereto.

Referring to FIG. 9, a terminal block may be implemented in a form in which a resonant capacitor 900 for compensation is inserted between terminals to which two induction power cables are connected to each other. For example, the capacitor for compensation may be inserted to prevent a high voltage from being applied across the induction power cable 122 when the induction power track 120 is long.

Figure 11:
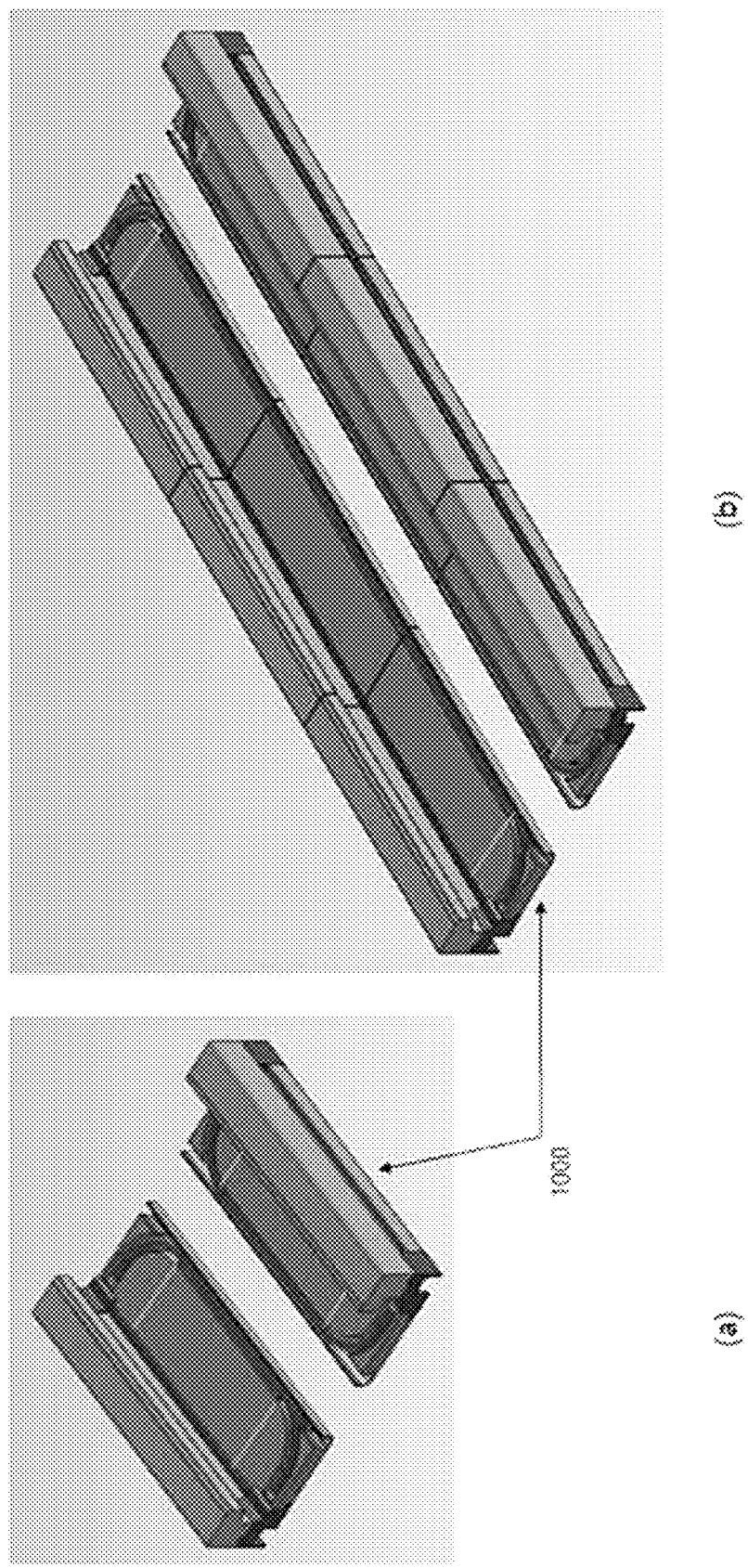

An embodiment of the present disclosure shows a rail/induction power cable assembly 1000 in which the rail 123, the induction power cable 122, the cable support 125, the cable guide 730, and the rail terminal block 129 are combined as shown in (a) of FIG. 11 and (b) of FIG. 11.

A rail and induction power cable installation method of a related art has the disadvantage that it takes a lot of time to install and the work is dangerous because the rail is installed first, the cable support is installed, and then the induction power cable is installed. In contrast, in an embodiment of the present disclosure, since the manufactured rail/induction power cable assembly is simply connected and fixed one after the other, it is very easy to install and is safe.

In the present embodiment, a rail including a plurality of cable yokes in which the cable support and the terminal block are installed is installed, and thereafter, the induction power cable is installed such that, instead of cutting the induction power cable on the spot, the induction power cable is previously cut according to a length between each terminal block, both sides are lug-treated, and the previously prepared induction power cable is installed after installation of the rail, thereby shortening an installation time of the rail and the induction power cable.

Further, in another embodiment according to the present disclosure, as shown in FIG. 10, the rail assembly 1000 in which the rail 123, the cable support 125, the cable guide 730, and the rail terminal block 129 are combined may be pre-assembled and installed, and the induction power cable may be installed later by previously measuring lengths between the terminal blocks and previously cutting the induction power cable according to the measured lengths. In this case, since installation of the induction power cable is simple and several induction power cables may be installed simultaneously, thereby significantly reducing an installation time. In this case, however, a cable length error may occur depending on a cable installation method, and it may be eventually difficult to assemble the cable to the terminal block.

Figure 12:
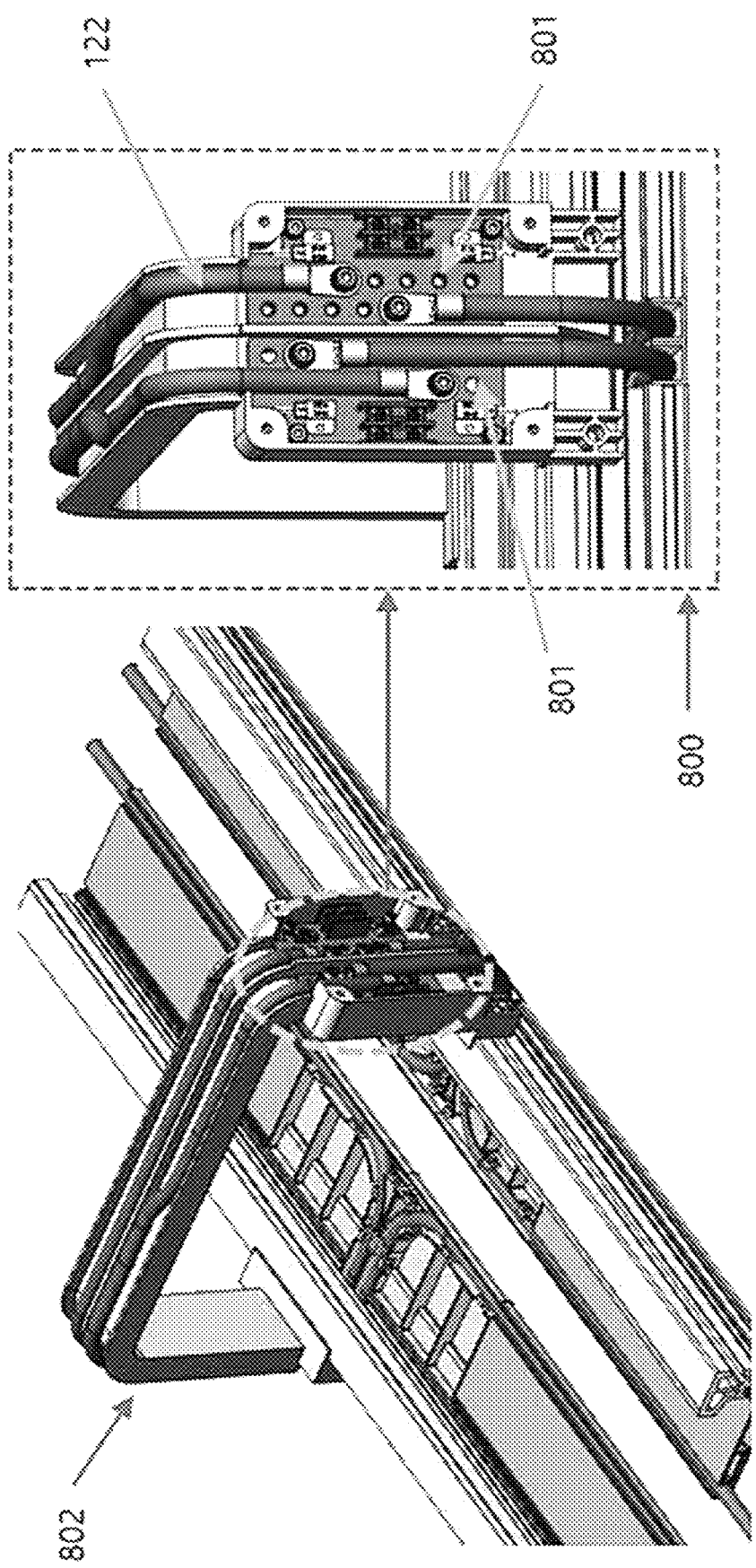
FIG. 12 is a view illustrating a structure of a busbar yoke terminal block having a plurality of fixing holes.

FIG. 12 shows a configuration of a yoke terminal block 800 having a plurality of fixing holes in preparation for this case. A terminal 801 is configured so that a cable lug is connected to any fixing hole therethrough at regular intervals in a wide busbar. When there is only one fixing hole in the terminal block to which the induction power cable is connected, a cable length error may not be acceptable, but, by providing a plurality of fixing holes and fixing the cable lug in a hole suitable for the cable length, an error of the feeding cable length within a certain range may be overcome.

FIG. 13 is a case in which terminal blocks are provided on both sides of the cable yoke, and both terminal blocks may be connected by one busbar 804, or the terminal blocks 800 as shown in FIG. 12 may be provided on both sides and connected by a cable. The induction power cables installed along both rails rise to the yoke terminal block and are connected to each other. A configuration in which both terminal blocks are connected by a large busbar disadvantageously incurs high cost.

Although preferred embodiments according to the present disclosure have been described above, the present disclosure is not limited thereto, and those skilled in the art to which the present disclosure pertains should interpret to encompass various variations without departing from the gist of the present disclosure appended in the claims. The claims are intended to cover such variations.

| [Description of reference numerals] | |
|---|---|
| 110: inverter | 112, 200: lead-in cable |
| 120: induction power track | 122: induction power cable |
| 123: rail | 124: cable yoke |
| 125: cable support | 126: lead-in terminal block |
| 128: yoke terminal block | 129: rail terminal block |
| 130: transfer vehicle | 210: inner core wire |
| 220: outer core wire | 230: heat sensing wire |
| 240: insulated coating | 250: lead-line outer coating |
| 260: dummy core | 300: heat sensing wire-integrated induction power cable |
| 310: induction power cable core wire | 320: induction power cable outer coating |
| 400: heat sensing wire-separated induction power cable | |
| 502, 602, 702: cable terminal | |
| 504, 604, 704: heat sensing wire terminal | |
| 510, 610, 710: overheat detection unit | |
| 520, 620: controller | 530, 720: cable lug |
| 640: second induction power track | 660, 670: feed current |
| 730: cable guide | |
| 800: a plurality of fixing hole busbar terminal block | |
| 801: busbar terminal | |
| 802: single terminal block cable yoke | |
| 803: double terminal block cable yoke | |
| 804: terminal block integrated connection busbar | |
| 900: compensation resonance capacitor | |
| 1000: rail/induction power cable assembly | |

The invention claimed is:

1. An automatic transportation system moving along a rail and receiving electric power by inductive feeding, the automatic transportation system comprising:
   an induction power cable installed along the rail;
   an induction power track configured as a closed loop by connecting one or more induction power cables to each other;
   an inverter configured to apply an alternating current (AC) to the induction power track;
   a lead-in cable configured to connect an output from the inverter to the induction power track;
   a heat sensing wire installed inside or outside the induction power cable or the lead-in cable and configured to detect heating of the cable;
   a detection device installed inside the inverter and configured to detect an open/short of the heat sensing wire; and
   a terminal block configured to connect one or more induction power cables to each other or connect the induction power cable to the lead-in cable, and connect the heat sensing wire to each other,
   wherein the terminal block includes a terminal for electrically connecting two cables; and
   an overheat detection unit configured to detect overheating of the terminal,
   wherein the inverter recognizes not only heating of the induction power cable but also an overheated state of the terminal block by shorting the heat sensing wire using an output from the overheat detection unit when overheating of the terminal is detected.

2. The automatic transportation system of claim 1, wherein
   the overheat detection unit is a temperature contact shorted at a preset temperature or higher, and
   when the terminal block is overheated, the heat sensing wire is shorted by directly connecting an output of the temperature contact to the heat sensing wire.

3. The automatic transportation system of claim 1, wherein the overheat detection unit includes a temperature sensor, a controller, and a relay, the controller senses a temperature of the terminal block, and in the case of overheating, the heat sensing wire is shorted by driving the relay.

4. The automatic transportation system of claim 3, wherein the overheat detection unit further includes a magnetic induction-based non-contact power supply unit configured to produce electric power upon receiving magnetic flux generated in the induction power cable to drive the controller.

5. The automatic transportation system of claim 3, wherein the controller is configured to divide a temperature of the terminal block measured through the temperature sensor into a warning level and a cut-off level and provide a warning or cut-off signal to the inverter by differentiating patterns for opening and shorting the heat sensing wire.

6. The automatic transportation system of claim 1, wherein, when the terminal block is provided in plurality, the inverter recognizes a position of the terminal block in the overheated state through measurement of resistance of a heat sensing wire closed loop formed when the heat sensing wire is shorted, and displays a recognition result or notifies a higher controller of the recognition result.

7. The automatic transportation system of claim 1, wherein the terminal block is installed between the induction power track and the lead-in cable.

8. The automatic transportation system of claim 1, wherein the terminal block is provided on a return cable yoke at an end of a disposition path of the induction power track to facilitate installation and extension of the induction power track.

9. The automatic transportation system of claim 8, wherein the terminal block provided on the return cable yoke is integrally implemented with the yoke.

10. The automatic transportation system of claim 8, wherein the terminal block for extending the induction power track is connected such that current directions of an existing induction power track and an extension induction power track are the same.

11. The automatic transportation system of claim 1, wherein, in the terminal block, a resonance capacitor for compensation is inserted between terminals in which two induction power cables are connected, to prevent a high voltage from being applied across the induction power cable when the induction power track is lengthened.

12. The automatic transportation system of claim 1, wherein
   the terminal block is configured by forming a space by cutting away a lower portion of the rail and inserting a plastic housing into the space so that there is no impediment for a wheel of a transfer vehicle to roll, and
   includes the overheat detection unit installed at an induction power cable connection terminal, a heat sensing wire connection terminal, and an induction power cable terminal.

13. The automatic transportation system of claim 1, wherein the terminal block includes a plurality of fixing holes in a busbar to accept a length error of the induction power cable and fixes to a hole fitting to a length of an induction power cable to be connected.

14. The automatic transportation system of claim 1, wherein,
   in a method of installing the rail and the induction power cable, a rail including a plurality of cable yokes in which a cable support and the terminal block are installed is installed, and thereafter, the induction power cable is installed such that, instead of cutting the induction power cable on the spot, the induction power cable is previously cut according to a length between the respective terminal blocks, both sides are lug-treated, and the previously prepared induction power cable is installed after installation of the rail, thereby shortening an installation time of the rail and the induction power cable.

15. The automatic transportation system of claim 1, wherein
   in a method of installing the rail and the induction power cable, one or more unit rails configuring the rail, the induction power cable, a cable support supporting the induction power cable, a curved portion cable guide for drawing the induction power cable out to an end portion of the unit rail, and a rail terminal block installed at a connection portion of the unit rails are integrally pre-assembled to form a rail/induction power cable assembly, and the rail/induction power cable assembly is installed in sequence, thereby facilitating installation of the rail and the induction power cable.

* * * * *